United States Patent
Sage (10) Patent No.: US 9,454,390 B2
(45) Date of Patent: Sep. 27, 2016

(54) EXECUTABLE CODE GENERATED FROM COMMON SOURCE CODE

(75) Inventor: Robert G. Sage, Mountain View, CA (US)

(73) Assignee: INTUIT INC., Mountain View, CA (US)

(*) Notice: Subject to any disclaimer, the term of this patent is extended or adjusted under 35 U.S.C. 154(b) by 1224 days.

(21) Appl. No.: 12/098,083

(22) Filed: Apr. 4, 2008

(65) Prior Publication Data

US 2009/0254878 A1 Oct. 8, 2009

(51) Int. Cl.
- *G06F 9/44* (2006.01)
- *G06F 9/455* (2006.01)
- *G06F 9/445* (2006.01)
- *G06F 9/45* (2006.01)

(52) U.S. Cl.
CPC ............ *G06F 9/45516* (2013.01); *G06F 8/67* (2013.01); *G06F 8/52* (2013.01); *G06F 9/4552* (2013.01); *G06F 9/45529* (2013.01)

(58) Field of Classification Search
CPC ....... G06F 9/45516; G06F 8/447; G06F 8/52
USPC ................................................. 717/106, 108
See application file for complete search history.

(56) References Cited

U.S. PATENT DOCUMENTS

| | | | | |
|---|---|---|---|---|
| 6,035,120 | A * | 3/2000 | Ravichandran | G06F 8/52 717/141 |
| 6,049,667 | A * | 4/2000 | Bates | G06F 8/447 717/138 |
| 6,282,707 | B1 * | 8/2001 | Isozaki | G06F 8/443 717/157 |
| 6,327,609 | B1 * | 12/2001 | Ludewig et al. | 709/203 |
| 6,353,925 | B1 * | 3/2002 | Stata et al. | 717/112 |
| 6,986,130 | B1 * | 1/2006 | Boucher | G06F 8/447 717/150 |
| 7,213,240 | B2 * | 5/2007 | Wong | G06F 8/443 717/148 |
| 7,254,808 | B2 * | 8/2007 | Trappen et al. | 717/143 |
| 7,565,312 | B1 * | 7/2009 | Shaw et al. | 705/31 |
| 7,590,572 | B2 * | 9/2009 | Larson | 705/31 |
| 7,668,763 | B1 * | 2/2010 | Albrecht | 705/31 |
| 7,725,885 | B1 * | 5/2010 | Pradhan | G06F 9/45516 717/148 |
| 8,024,399 | B2 * | 9/2011 | Reisman | 709/203 |
| 8,407,675 | B1 * | 3/2013 | Clark | G06F 8/53 717/131 |
| 2002/0111888 | A1 * | 8/2002 | Stanley et al. | 705/31 |
| 2004/0143823 | A1 * | 7/2004 | Wei | 717/140 |
| 2004/0221278 | A1 * | 11/2004 | Dankel | G06F 9/45516 717/139 |
| 2004/0221279 | A1 * | 11/2004 | Lovett | G06F 9/45516 717/151 |
| 2005/0149913 | A1 * | 7/2005 | Wang | G06F 9/45516 717/136 |

(Continued)

FOREIGN PATENT DOCUMENTS

WO    WO 2007000015 A1 * 1/2007 ............ 717/106

*Primary Examiner* — Wei Zhen
*Assistant Examiner* — Brahim Bourzik
(74) *Attorney, Agent, or Firm* — Patterson & Sheridan, LLP (57) ABSTRACT

A computer system generates first executable code in a first programming language based on common source code, where the first executable code is configured to execute at a server in the client-server environment. Then, the computer system executes the first executable to produce relational objects that constitute a tree hierarchy, where a given relational object defines a relationship between nodes and end points in the common source code. Next, the computer system generates second executable code in a second programming language based on the tree hierarchy, where the second executable code is configured to execute at a client in the client-server environment, and where the second executable code implements a subset of the common source code associated with the relational objects which is based on a user context.

19 Claims, 8 Drawing Sheets

(56) References Cited

U.S. PATENT DOCUMENTS

| | | | |
|---|---|---|---|
| 2005/0188353 A1* | 8/2005 | Hasson et al. | 717/116 |
| 2007/0006184 A1* | 1/2007 | Andrews | G06F 9/45516 717/136 |
| 2007/0162456 A1* | 7/2007 | Agassi et al. | 707/10 |
| 2007/0226700 A1* | 9/2007 | Gal | G06F 8/52 717/128 |
| 2008/0250231 A1* | 10/2008 | Tagawa | G06F 8/52 712/220 |

* cited by examiner

USER INPUTS

| HOURS WORKED | |
| HOURLY RATE | |

| PAYCHECK LINES | CALCULATED RESULTS |
|---|---|
| PAYCHECK WAGES | |
| FEDERAL INCOME TAX | |
| MEDICARE | |
| MEDICARE COMPANY | |
| SOCIAL SECURITY | |
| SOCIAL SECURITY COMPANY | |
| FEDERAL UNEMPLOYMENT | |
| ADVANCED EARNED INCOME TAX CREDIT | |
| CA – INCOME TAX | |
| CA - UNEMPLOYMENT | |
| CA – EMPLOYMENT TRAINING TAX | |
| CA – DISABILITY | |
| NET PAYCHECK AMOUNT | |

EXECUTABLE CODE GENERATED FROM COMMON SOURCE CODE

BACKGROUND

The present invention relates to techniques for generating executable code from common source code.

A key question in the design of a hosted-business application architecture is where the complex business logic will reside. In traditional client-server systems, this logic is coded in the business-logic layer to be deployed/executed on the server, as opposed to in the user-interface layer to be deployed/executed on a remote machine, such as a client. While this architecture is safe and easy to maintain, system performance and the user-experience can be poor because any calculation requires a server request, which can increase the server load and often has an associated delay between the time the user requests a result and receives the answer.

A wide variety of approaches are used to address these challenges in existing systems. For example, some approaches, such as Asynchronous JavaScript™ with XML (AJAX), allow small amounts of data to be retrieved from the server to update the user interface at the client (for example, a portion of web page in a web browser) without refreshing the entire web page. This approach offers the feel of a desktop application. However, it may still be subject to delays between the time the user requests and receives a bit of information, and it can increase the server load because a server request occurs even though the user may not always realize it.

In another approach, business logic is duplicated in the user-interface layer, for example, JavaScript™, that is sent to a web browser to be executed on the client. This approach can provide improved responsiveness (and, thus, an improved user experience) and may reduce server load. However, it can give rise to software bugs because the business logic is coded at two places, and in the event of changes to the software it can be difficult to coordinate changes to both instances of the business logic.

Alternatively, in some applications large pieces of business logic may be pushed to the client when an application is first used, and then updated periodically thereafter. This approach can provide good responsiveness and may reduce the server load. However, the initial download experience may be frustrating for users. Moreover, maintaining an up-to-date version of the application on the client can be difficult.

SUMMARY

One embodiment of the present invention provides a computer system that generates executable code for use at multiple locations in a client-server environment. During operation, the computer system generates first executable code in a first programming language based on common source code, where the first executable code is configured to execute at a server in the client-server environment. Then, the computer system executes the first executable to produce relational objects that constitute a tree hierarchy, where a given relational object defines a relationship between nodes and end points in the common source code. Next, the computer system generates second executable code in a second programming language based on the tree hierarchy, where the second executable code is configured to execute at a client in the client-server environment, and where the second executable code implements a subset of the common source code associated with the relational objects which is based on a user context.

In some embodiments, the first executable code is compiled from the common source code.

In some embodiments, the second executable code is configured to execute in conjunction with an interpreter application at the client. Moreover, the interpreter application may be configured to perform run-time calls that define how commands are implemented in the second executable code.

In some embodiments, the second executable code executes in a web-browser environment at the client.

Note that the second executable code may be generated based on a request from the client that, at least in part, defines the user context. Moreover, the request may include a request for a web page, which includes a form, and the form may include one or more fields. For example, the form may include income-tax or payroll information.

In some embodiments, the second executable code is generated prior to a request from the client.

In some embodiments, the first programming language and the second programming language are different. For example, the first programming language may include Java™ and the second programming language may include Javascript™.

In some embodiments, the second executable code includes objects that perform calculations.

Note that the second executable code may be generated: by translating the tree hierarchy into the second programming language and/or by using an application that interprets the relational objects.

In some embodiments, the nodes include mathematical operations and/or Boolean logic. Moreover, the end points may include values.

In some embodiments, the common source code includes computer instructions that determine values.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer-program product (e.g., software) for use with the computer system that generate executable code from a common source code for use at multiple locations in a client-server environment are described. These devices and processes may allow hosted business applications to provide immediate or rapid calculation results at a client without: the latency associated with a server request; duplication of business logic (for example, in the user-interface layer); and/or the downloading of large pieces of business logic or software components to the client.

In particular, first executable code in a first programming language that is configured to execute on the server may be generated based on common source code. For example, the common source code, which defines the business logic and is written in a high-level programming language or a domain-specific programming language, may be converted into Java™ source code, which may be subsequently compiled by a Java™ compiler to produce a class file(s) or bytecode (or the first executable code) at any time up to the run time.

Moreover, this first executable code may be executed to produce relational objects that constitute a tree hierarchy. Note that a given relational object defines a relationship between nodes and end points in the common source code, such as arithmetic operations. Additionally, second executable code in a second programming language (such as Javascript™) may be generated at or before run time based on the tree hierarchy. This second executable code may be configured to execute at a client in the client-server environment. Alternatively, by using an application that interprets the relational objects, calculation results, such as those which can be determined using the second executable code, may be obtained.

Note that the second executable code implements a subset of the common source code associated with the relational objects which is based on a user context. In some embodiments, the user context is defined, at least in part, by a request from a client, such as a request for a web page that includes a form.

For example, the common source code may include implicit relationships (such as the relational objects) that construct a node or hierarchical tree when a subset of the common source code is executed (via the first executable code). This node tree may be transformed into the second executable code, such as Javascript™. Note that this second executable code may include embedded fields for unknown values that are to be provided by a user at the client computer. Consequently, the second executable code may execute at the client computer in conjunction with an interpreter application at the client computer, which performs run-time calls to the second executable code that define implementation of commands in the second executable code. In some embodiments, the second executable code executes in a browser environment at the client computer.

Because this technique may be utilized at or before the run time (as opposed to at the build time) to push exactly the subset of common source code that is needed for a particular scenario (such as a form that a user will fill in), it is sometimes referred to as a "just-enough, just-in-time" approach. This approach may overcome the challenges associated with implementing business logic in a hosted-business application architecture, especially for software applications where there is considerable business logic and it is a challenge to keep it up to date (for example, when there are changes in compliance-based applications, such as income-tax software).

Note that executable code generated using this technique may be implemented as a stand-alone software application, or as a program module or subroutine in another application, such as: financial software, accounting software, payroll software, and/or income-tax software. Furthermore, at least a portion of the software application (such as the second executable code) may be configured to execute on a client computer, such as: a personal computer, a laptop computer, cell phone, PDA, or other device capable of manipulating computer readable data, or between two or more computing systems over a network (such as the Internet, World Wide Web or WWW, an intranet, LAN, WAN, MAN, or combination of networks, or other technology enabling communication between computing systems). Therefore, information associated with the second executable code may be stored locally (for example, on a local computer) and/or remotely (for example, on a computer or server that is accessed via a network).

Figure 1:
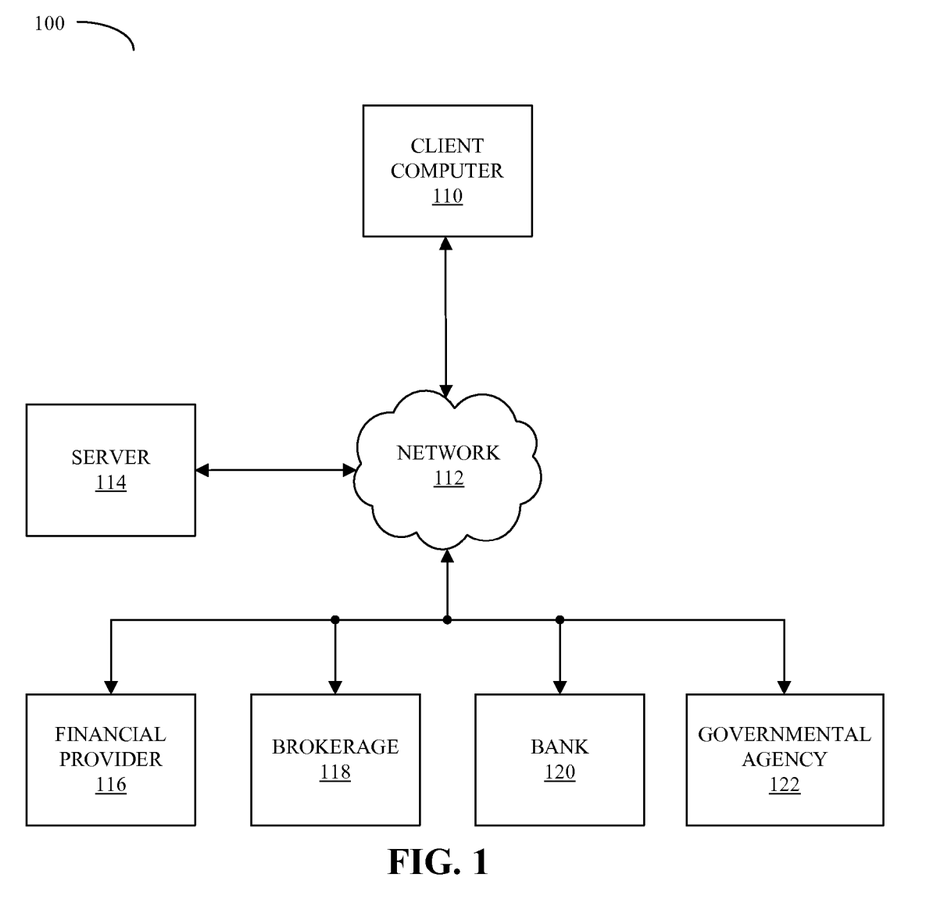
FIG. 1 is a block diagram illustrating a computer system that includes computers and servers that are networked together in accordance with an embodiment of the present invention.

We now describe embodiments of systems, devices and processes for generating executable code. FIG. 1 presents a block diagram illustrating a computer system 100, including computers and servers that are networked together. In this computer system, one or more users may use financial software, such as accounting, payroll and/or income-tax software, to input or collect information and to perform associated calculations. For example, a portion of the financial software, such as a data tier and/or middle-tier business logic associated with the first executable code, may execute on server 114. When needed, another portion of the financial software, such as a user-interface tier and/or middle-tier business logic associated with the second executable code, may be provided via network 112 (such as the Internet) to client computer 110.

This other portion of the financial software may execute on client computer 110 or in the environment of an application on the client computer 110. For example, the other portion of the financial software may be provided in one or more web pages. These web pages may execute in a web browser or in the environment of the web browser. As noted above, the second executable code may execute in conjunction with an interpreter application that is resident on the client computer 110 or which is also included in the one or more web pages.

In an exemplary embodiment, a user at client computer 110 is using the financial software. In response to a request from the user, such as a request for a form that includes one or more fields (for example, one or more forms of income-tax or payroll information), the second executable code may be generated and provided to the user in one or more web pages. However, note that in some embodiments, such as when there are a finite number of variations on the second executable code based on the state of the financial software (for example, a finite number of forms that the user may need), the second executable code may be generated prior to the request from the client computer 110.

After receiving the one or more web pages, the user may provide information in the one or more fields in the form. In some embodiments, the user types in the information. However, in some embodiments at least a portion of the information is received from other sources via network 112, such as remotely stored information associated with the user and/or the user's accounts at: financial provider 116, brokerage 118, bank 120, and/or governmental agency 122 (for example, an income-tax agency or an unemployment agency).

While providing the information, the second executable code, in conjunction with the interpreter application, may perform calculations at the client computer 110. For example, the second executable code may include objects that perform mathematical and/or Boolean operations based on the information that is provided and/or collected. Because these objects are included in the second executable code, there is no latency associated with computation requests to perform these calculations at the server 114 (thus, the one or more web pages may refresh quickly). Moreover, there is no additional loading of the server 114 associated with such computation requests. As noted above, the objects included in the second executable code may be exactly the subset of the common source code associated with the form and/or the one or more fields. Consequently, the second executable code may be compact, which facilitates fast download times. And because the first executable code and the second executable code are derived from the common source code, the middle-tier business logic at the client computer 112 and the server 114 may always be synchronized.

As noted above, this financial software may be a stand-alone application or may be embedded in another application. In one embodiment, the financial software includes software such as: TurboTax™ (from Intuit, Inc., of Mountain View, Calif.), TaxCut™ (from H&R Block, Inc., of Kansas City, Mo.), TaxACt™ (from 2$^{nd}$ Story Software, Inc., of Cedar Rapids, Iowa), and/or other software capable of preparing an income-tax return.

Moreover, the financial software may include software such as: QuickBooks™ (from Intuit, Inc., of Mountain View, Calif.), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information. Additionally, in some embodiments the financial software includes software such as: Quicken™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

In some embodiments, at least a portion of the financial software (such as the second executable code and/or the interpreter application) may be resident on the computer 110. However, other embodiments may utilize a financial tool that is embedded in a web page (once again, either as a stand-alone application or as a portion of another application). This web page may be provided by server 114 via network 112. In an illustrative embodiment, the financial tool is a software package written in: JavaScript™ (e.g., the financial tool includes programs or procedures containing JavaScript instructions), ECMAScript (the specification for which is published by the European Computer Manufacturers Association International), VBScript™ (a trademark of Microsoft, Inc.) or any other client-side scripting language. In other words, the embedded financial tool may include programs or procedures containing: JavaScript™, ECMAScript instructions, VBScript™ instructions, or instructions in another programming language suitable for rendering by a web browser or another client application on the computer 110.

In embodiments where the financial tool is embedded in a web page or executes in an environment on computer 110, information associated with one or more fields in a form may be temporarily stored on the computer 110. Subsequently, this information may be provided to the server 114 via the network 112. Moreover, the information stored on the server 114 may be periodically synchronized with the information stored on the computer 110.

Because the information associated with the form may be sensitive in nature, in some embodiments such information may be encrypted. Additionally, this information may be encrypted when it is communicated over the network 112. For example, communication may utilize a protocol such as HyperText Transfer Protocol Secure (HTTPS).

Note that in some embodiments the computer system 100 includes fewer or additional components. Moreover, two or more components are combined into a single component, and/or a position of one or more components may be changed.

Figure 2:
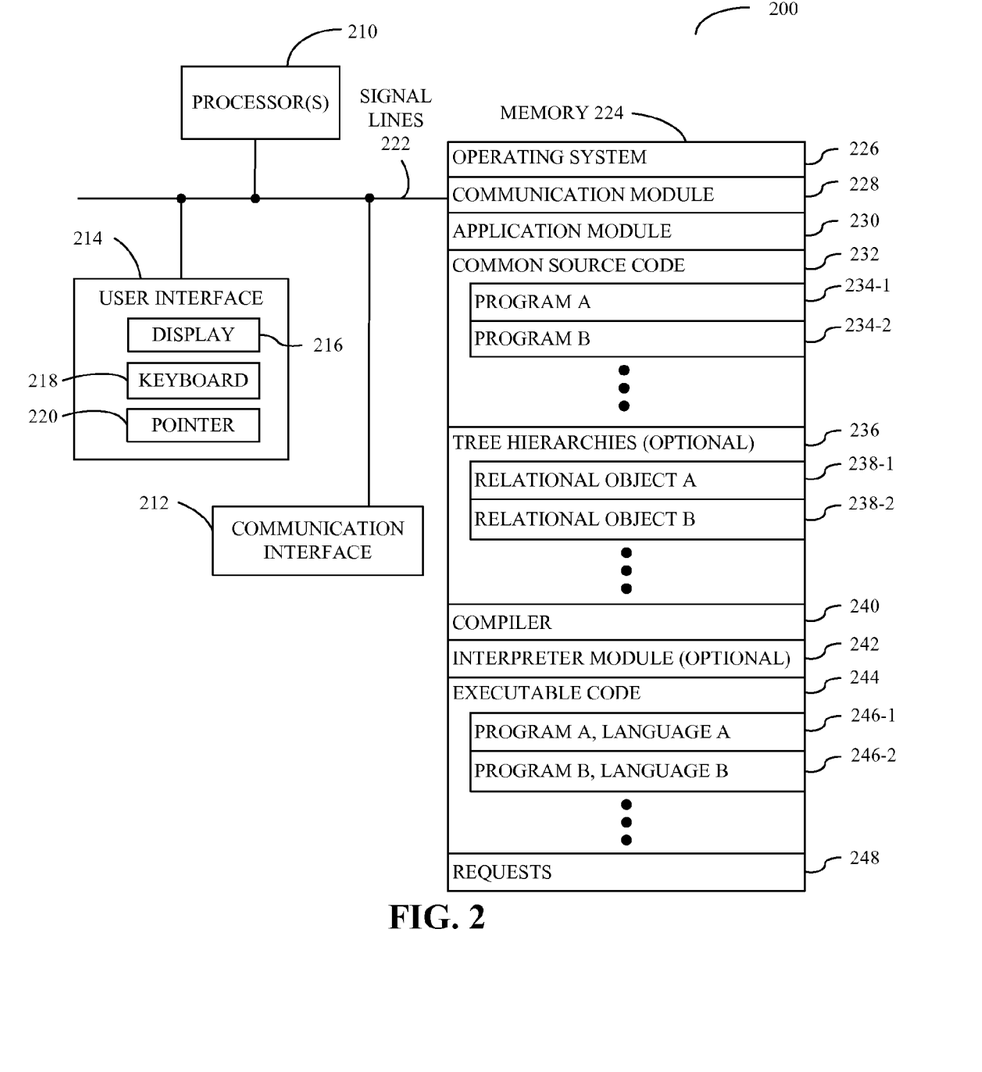
FIG. 2 is a block diagram illustrating a computer system in accordance with an embodiment of the present invention.

FIG. 2 presents a block diagram illustrating a computer system 200. Computer system 200 includes one or more processors 210, a communication interface 212, a user interface 214, and one or more signal lines 222 coupling these components together. Note that the one or more processing units 210 may support parallel processing and/or multi-threaded operation, the communication interface 212 may have a persistent communication connection, and the one or more signal lines 222 may constitute a communication bus. Moreover, the user interface 214 may include: a display 216, a keyboard 218, and/or a pointer 220, such as a mouse.

Memory 224 in the computer system 200 may include volatile memory and/or non-volatile memory. More specifically, memory 224 may include: ROM, RAM, EPROM, EEPROM, Flash, one or more smart cards, one or more magnetic disc storage devices, and/or one or more optical storage devices. Memory 224 may store an operating system 226 that includes procedures (or a set of instructions) for handling various basic system services for performing hardware-dependent tasks. While not explicitly indicated in the computer system 200, in some embodiments the operating system 226 includes a web browser. Memory 224 may also store procedures (or a set of instructions) in a communication module 228. These communication procedures may be used for communicating with one or more computers and/or servers, including computers and/or servers that are remotely located with respect to the computer system 200.

Memory 224 may also include multiple program modules (or a set of instructions), including application module 230 (or a set of instructions) and/or optional interpreter module 242 (or a set of instructions). Application module 230 may generate executable code 244, such as program A in programming language A 246-1 (for example, the first executable code) and/or program B in programming language B 246-2 (for example, the second executable code), from common source code 232, such as program A 234-1 and/or program B 234-2. In particular, using compiler 240, application module 230 may generate the first executable code.

Additionally, application module 230 may generate one or more optional tree hierarchies 236, such as relational object A 238-1 and/or relational object B 238-2, by executing one or more of the executable codes 244. Subsequently, such as in response to one or more requests 248 from one or more users, application module 230 may translate at least a portion of one or more of the optional tree hierarchies 236 in order to generate second executable code. As noted above, this second executable code may be executed at a client computer and/or in the environment of another application, such as a web browser, at the client computer in conjunction with optional interpreter module 242.

Instructions in the various modules in the memory 224 may be implemented in: a high-level procedural language, an object-oriented programming language, and/or in an assembly or machine language. Note that the programming language may be compiled or interpreted, e.g., configurable or configured to be executed by the one or more processing units 210.

Although the computer system 200 is illustrated as having a number of discrete items, FIG. 2 is intended to be a functional description of the various features that may be present in the computer system 200 rather than as a structural schematic of the embodiments described herein. In practice, and as recognized by those of ordinary skill in the art, the functions of the computer system 200 may be distributed over a large number of servers or computers, with various groups of the servers or computers performing particular subsets of the functions. In some embodiments, some or all of the functionality of the computer system 200 may be implemented in one or more application-specific integrated circuits (ASICs) and/or one or more digital signal processors (DSPs).

Computer system 200 may include fewer components or additional components. Moreover, two or more components may be combined into a single component, and/or a position of one or more components may be changed. In some embodiments, the functionality of the computer system 200 may be implemented more in hardware and less in software, or less in hardware and more in software, as is known in the art.

Figure 3:
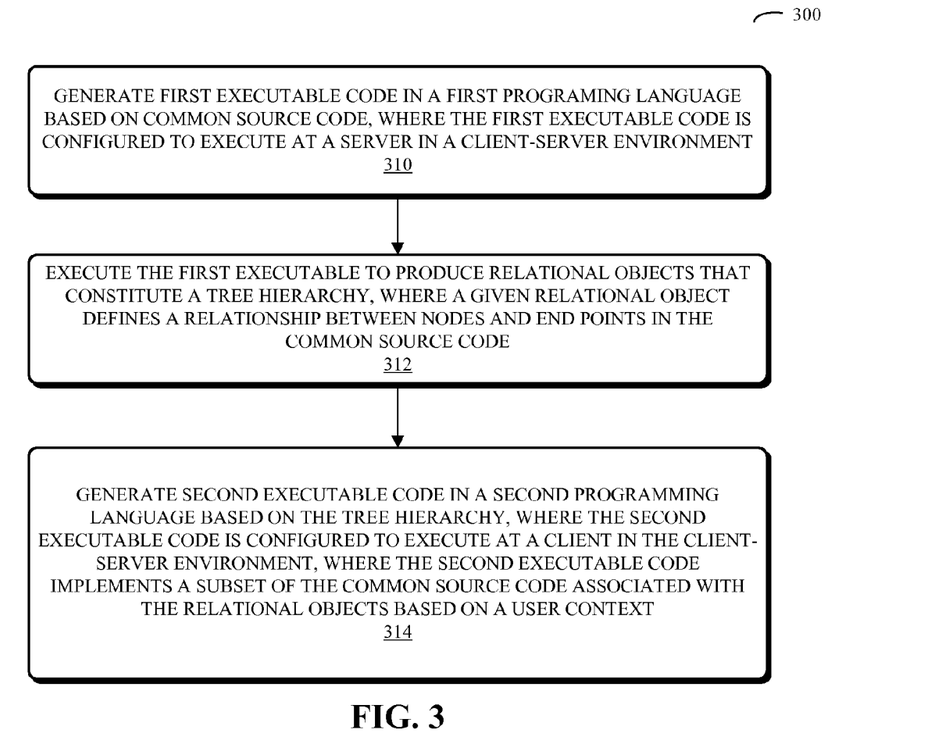
FIG. 3 is a flowchart illustrating a process for generating executable code for use at multiple locations in a client-server environment in accordance with an embodiment of the present invention.

We now discuss methods for generating executable code for use at multiple locations in a client-server environment. FIG. 3 presents a flowchart illustrating a process 300 for generating executable code for use at multiple locations in a client-server environment, which may be performed by a computer system. During operation, the computer system generates first executable code in a first programming language based on common source code (310), where the first executable code is configured to execute at a server in the client-server environment. Then, the computer system executes the first executable to produce relational objects that constitute a tree hierarchy (312), where a given relational object defines a relationship between nodes and end points in the common source code. Next, the computer system generates second executable code in a second programming language based on the tree hierarchy (314), where the second executable code is configured to execute at a client in the client-server environment. Note that the second executable code implements a subset of the common source code associated with the relational objects which is based on a user context.

In some embodiments of process 300, there may be additional or fewer operations. Moreover, the order of the operations may be changed, and two or more operations may be combined into a single operation.

We now describe the relational objects in the tree hierarchy in more detail. In the preceding discussion, business logic in a hosted-business application architecture is implemented once in the common source code in a business logic tier. Note that the business logic may include computer instructions that determine values. Moreover, functionality associated with this business logic may be divided between a server and a client computer using the first executable code and the second executable code, respectively.

Figure 4:
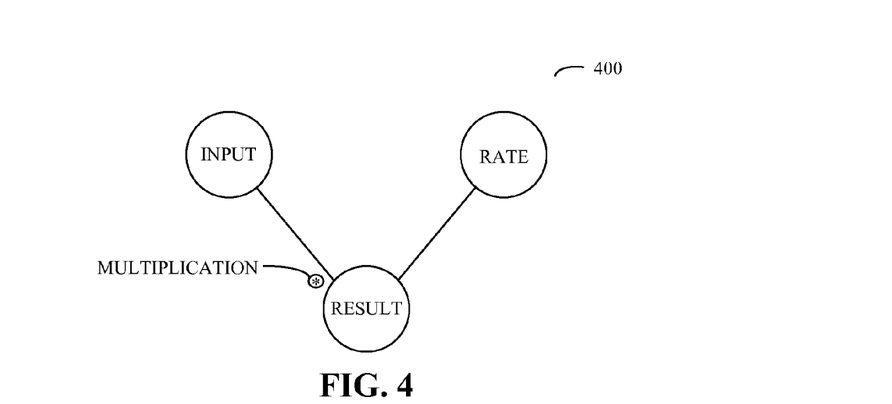
FIG. 4 is a block diagram illustrating a relational object in accordance with an embodiment of the present invention.

In particular, where appropriate, calculations to be performed at the client computer may be implemented as a tree or hierarchy of relational objects. FIG. 4 is a block diagram illustrating a relational object 400, which multiplies an 'input' by a 'rate' to produce a value, such as 'result.' Note that relational object 400 includes: one or more arithmetic or Boolean operations (such as multiplication), one or more instruction nodes (such as 'input' and 'rate'), and one or more end points (such as 'result').

In some embodiments, the tree is executed at run time to obtain the calculation result. However, in other embodiments, the tree is made available as data to a user-interface layer that dynamically transforms the data into a browser-compatible script language (e.g., JavaScript™) that is provided to a user in one or more web pages. The size of the content of the one or more web pages may be reduced because only the business logic that is absolutely needed for a particular scenario, such as a form which includes one or more fields, is sent. Note that by using this technique, the appropriate business logic may be transformed into browser-compatible code at run-time (as opposed to at build time) and/or only the code that is needed for the particular scenario may be pushed to the client computer.

Note that the the relational objects may be generated from: the common source code, from the first executable code (such as a Java™ class file), which, in turn, may be generated from the common source code, and/or from other intermediate source code that is derived from the common source code. Moreover, in some embodiments the first executable code, such as a Java™ class file, is constrained to facilitate generation of the second executable code, for example, patterns and/or conventions may be defined using a simple higher-level programming language (as described further below).

Figure 5:
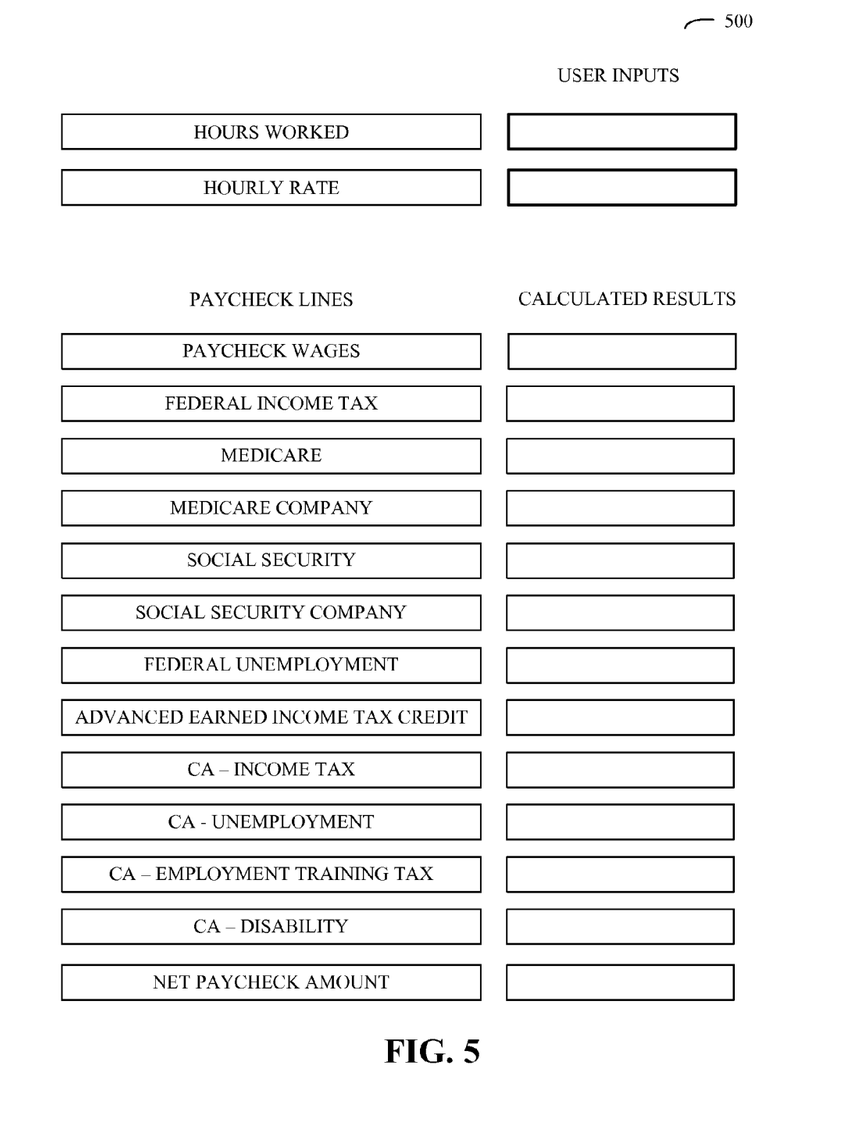
FIG. 5 is a drawing illustrating a form for a paycheck income-tax calculation in accordance with an embodiment of the present invention.

We now describe exemplary embodiments that generate executable code for use at multiple locations in a client-server environment. A typical payroll engine may include hundreds of thousands of lines of Java™ code (megabytes of compiled Java™ class files) that describe how to calculate payroll taxes. However, the business logic used to calculate payroll taxes for a Jan. 1, 2007 paycheck for an employee that is single and lives in California can be represented in the approach described above using only a few kilobytes of JavaScript™, which can be sent to a web browser along with the paycheck user-interface web page. This is shown in FIG. 5, which is a drawing illustrating a form 500 in a paycheck income-tax calculation. Note that using this web page, a user may change the paycheck wages or other inputs in the editable fields, and the associated income taxes may be recalculated at the client computer (as opposed to occurring at a server).

For such a paycheck income-tax calculation, Table 1 presents pseudo-code illustrating the common source code (which is written in the higher-level language described above). In this implementation, the higher-level programming language contains payroll constructs, which are sometimes referred to as 'domain specific language.' This is how an engineer/analyst may initially code the paycheck calculation for a particular income tax. In this example, the calculation is simply the taxable wages multiplied by a fixed rate (2%), which may reside in a file or class that is linked or associated with the income tax.

TABLE 1

```
Paycheckline Rules
{
  Object AMOUNT.getValue( )
  {
    return Paycheckline.WAGE_BASE * 2%
  }
}
```

At build time, this common source code may be run through a Java™-code generator to generate Java™ or a Java™ class file (i.e., the first executable code), such as the pseudo-code illustrated in Tables 2 or 3 (which are different embodiments of the same relational objects).

TABLE 2

```
private static class PaycheckLine_AMOUNT_getValueInstructions
extends DatumMethod {
  public Object call(Datum datum) {
    return Calc.createCalcNode ( Calc.multiply (
      datum.getPaycheckLineImpl().getDatum (
        DatumID.WAGE_BASE ),
      Calc.createScalar ( "2%" ));
  }
}
```

TABLE 3

```
private static class PaycheckLine_AMOUNT_getValueInstructions
extends DatumMethod {
  public Object call(Datum datum) {
    InstructionContext c = new InstructionContext( );
    c.ret (
      c.multiply (
        datum.getPaycheckLineImpl( ).getDatum
          (DatumID.WAGE_BASE),
        Calc.createScalar ( "2%" ) ) );
    return c.getFirstInstruction( );
  }
}
```

At run time, this Java™ class file may be executed in response to a request for the paycheck user-interface web page. For example, general purpose Java™ code may read the 'node tree' starting from the root 'multiply' node to generate the Javascript™ shown in Table 4.

Note that this second executable code can subsequently perform the income-tax calculation when the web page is loaded into the web browser on the client computer. In particular, fv3823508( ) is a function that retrieves the current value of the wage base field (which is included at another location in the web page, and can change as the user adjusts the editable values in the web page).

TABLE 4

```
function fv3823508( ) { // CA - Disability Amount Amount
  return RETURN ( MULTIPLY ( fv4973260( ), CN("2%") ) );
}
```

Note that the RETURN, MULTIPLY, CN functions may be implemented using an additional Javascript™ library. This additional library may be able to overcome the problems of floating point arithmetic that can occur when the default Javascript™ math library is used for fixed-point calculations, such as currency calculations. Moreover, this additional library may make it easier to generate the second executable code, because method/parameter invocation may inherently be more recursive than if/then/else blocks.

Tables 5-7 illustrate pseudo-code for another example, which highlights some of the subtleties associated with the handling of conditional nodes. Note that this income-tax calculation is conditional on both the paycheck date and the amount of taxable wages. In this implementation, the user-interface web page may initiate a new request if a user changes the paycheck date. In order to filter the amount of code in the subsequent tables, the @InstructionContextStart/ @InstructionContextEnd tags indicate where to begin and where to end generating the second executable code for a particular set of parameters. Moreover, in this example, if the paycheck date is before Jan. 1, 2008, the common source code indicates that, if wages are greater than 1000, the wages are multiplied by 2%; otherwise, the wages are multiplied by 1%. Also note that the common source code also includes conditional nodes (such as 'if wages >1000'), which provides another example of a payroll 'domain specific language.'

TABLE 5

```
PaycheckLine.Rules
{
    @GenerateInstructions
    Object AMOUNT.getValue( )
    {
      if Date.lessThan ( Paycheck.PAYROLL_DATE, "1/1/2008" ):
        @InstructionContextStart
        if PaycheckLine.WAGE_BASE > 1000.00:
          return PaycheckLine.WAGE_BASE * 2%
        else:
          return PaycheckLine.WAGE_BASE * 1%
        @InstructionContextEnd
      else:
        // 1/1/2008 or after
        @InstructionContextStart
        if PaycheckLine.WAGE_BASE > 1000.00:
          return PaycheckLine.WAGE_BASE * 4%
        else:
          return PaycheckLine.WAGE_BASE * 3%
        @InstructionContextEnd
    }
}
```

At build time, this common-source-code snippet may be run through a Java™-code generator to generate Java™ or a Java™ class file (i.e., the first executable code), such as the pseudo-code illustrated in Tables 6.

TABLE 6

```
private static class PaycheckLine__AMOUNT__getValueInstructions
    extends DatumMethod {
    public Object call(PsDatum datum)
    {
        if ( Calc.createBoolean (
            CalcDate.lessThan (
                getPaycheckImpl( ).getDatum
                    (DatumID.PAYROLL_DATE ),
                CalcDate.createDate ( "1/1/2008" ) ) ) )
        {
            InstructionContext c = new InstructionContext( );
            c.pushIf (
                c.cond (
                    AttributeTest.GREATER_THAN,
                    datum.getPaycheckLineImpl( ).-
                        getDatum(DatumID.WAGE_BASE),
                    Calc.createScalar ( "1000.00" ) ) );
            {
                c.ret (
                    c.multiply (
                        getPaycheckLineImpl( ).getDatum (DatumID.-
                            WAGE_BASE ),
                        Calc.createScalar ( "2%" ) ) );
                c.pop( );
            }
            c.pushElse ( );
            {
                c.ret (
                    c.multiply (
                        getPaycheckLineImpl( ).getDatum (DatumID.-
                            WAGE_BASE ),
                        Calc.createScalar ( "1%" ) ) );
                c.pop( );
            }
            return c.getFirstInstruction( );
        }
        else
        {
            InstructionContext c = new InstructionContext( );
            c.pushIf (
                c.cond (
                    AttributeTest.GREATER_THAN,
                    getPaycheckLineImpl( ).getDatum
                        ( DatumID.WAGE_BASE ),
                    Calc.createScalar ( "1000.00" ) ) );
            {
                c.ret (
                    c.multiply (
                        getPaycheckLineImpl( ).getDatum
                            ( DatumID.WAGE_BASE ),
                        Calc.createScalar ( "4%" ) ) );
                c.pop( );
            }
            c.pushElse (        );
            {
                c.ret (
                    c.multiply (
                        getPaycheckLineImpl( ).getDatum
                            ( DatumID.WAGE_BASE ),
                        Calc.createScalar ( "3%" ) ) );
                c.pop( );
            }
            return c.getFirstInstruction( );
        }
    }
}
```

Once again, at run time the first executable code may be executed during preparation of the paycheck user-interface web page. In this example, the user has already chosen Dec. 31, 2007 as the paycheck date, so the execution path follows the first 'if' statement, building a node tree with the conditional operation 'if wages >1000' as its root, and the two multiplication statements as the first children operations. Note that portion of the common source code associated with paycheck dates after and including Jan. 1, 2008 is not included in the second executable code, which limits the size of the content that will be downloaded with the web page.

Table 7 illustrates psueudo-code illustrating Javascript™ for the second executable code. In particular, fv32512553( ) is a Javascript™ function that returns the current paycheck wages as explained above. Moreover, as mentioned above, if the user changes the paycheck date, the user-interface web page may initiate a new server request to get a new web page, such as one that may include the calculation node tree from the 'else' clause (i.e., for a paycheck date on or after Jan. 1, 2008).

TABLE 7

```
function fv11150143( ) { // CA - Income Tax Amount Amount
    return IF ( COND ( '>', fv32512553( ), CN(1000) ),
        RETURN ( MULTIPLY ( fv32512553( ), CN("2%") ) ),
        ELSE ( null, RETURN ( MULTIPLY ( fv32512553( ),
            CN(0.01) ) ) ), null );
}
```

Figure 6A:
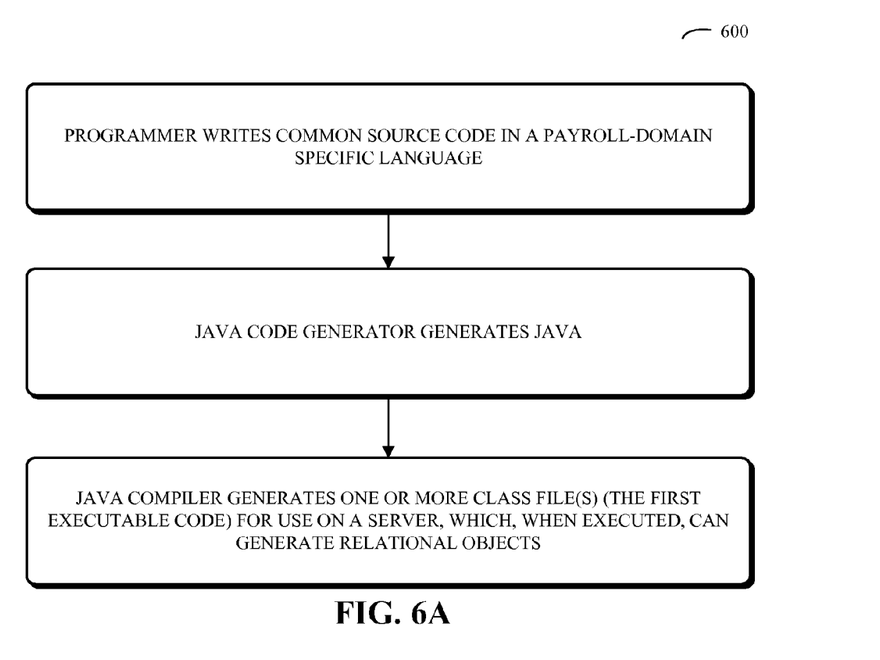
FIG. 6A is a flowchart illustrating a process for generating executable code in accordance with an embodiment of the present invention.
Figure 6B:
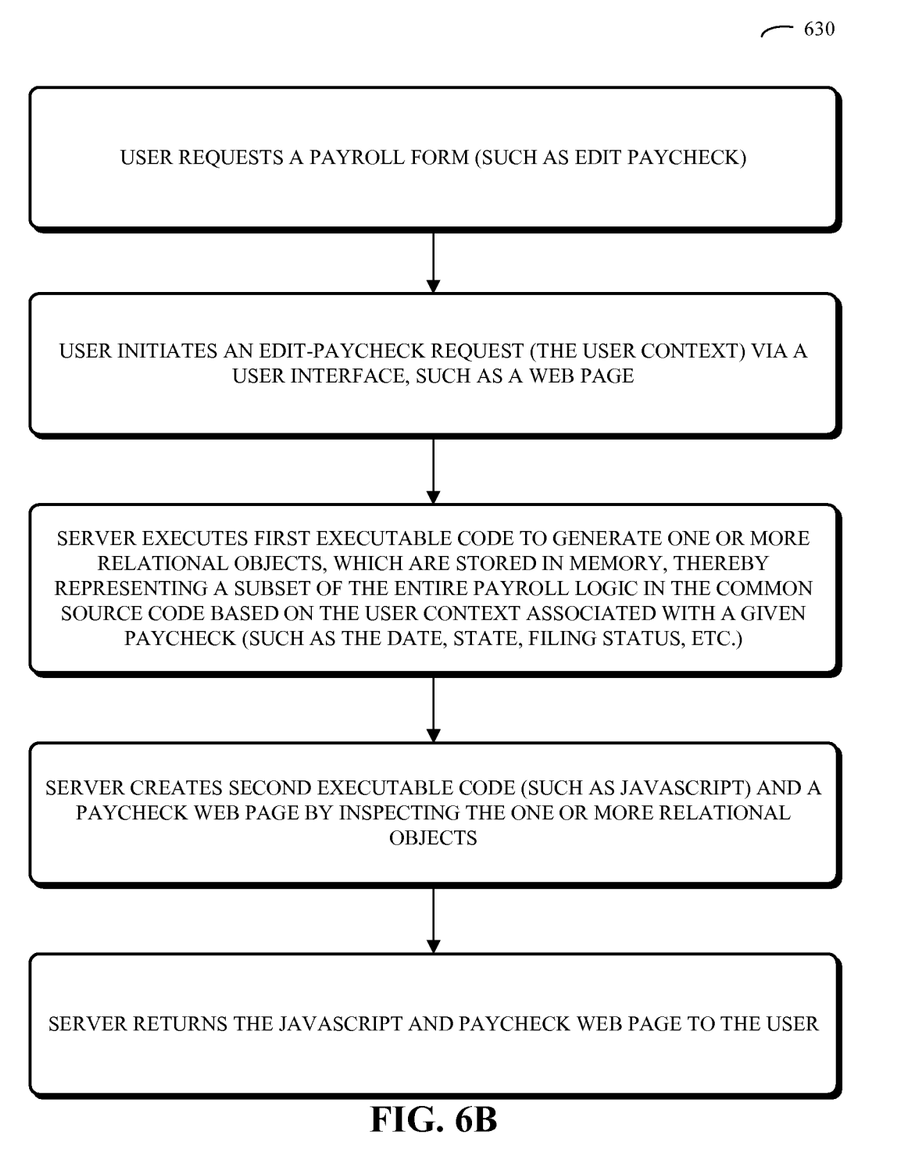
FIG. 6B is a flowchart illustrating a process for generating executable code in accordance with an embodiment of the present invention.
Figure 6C:
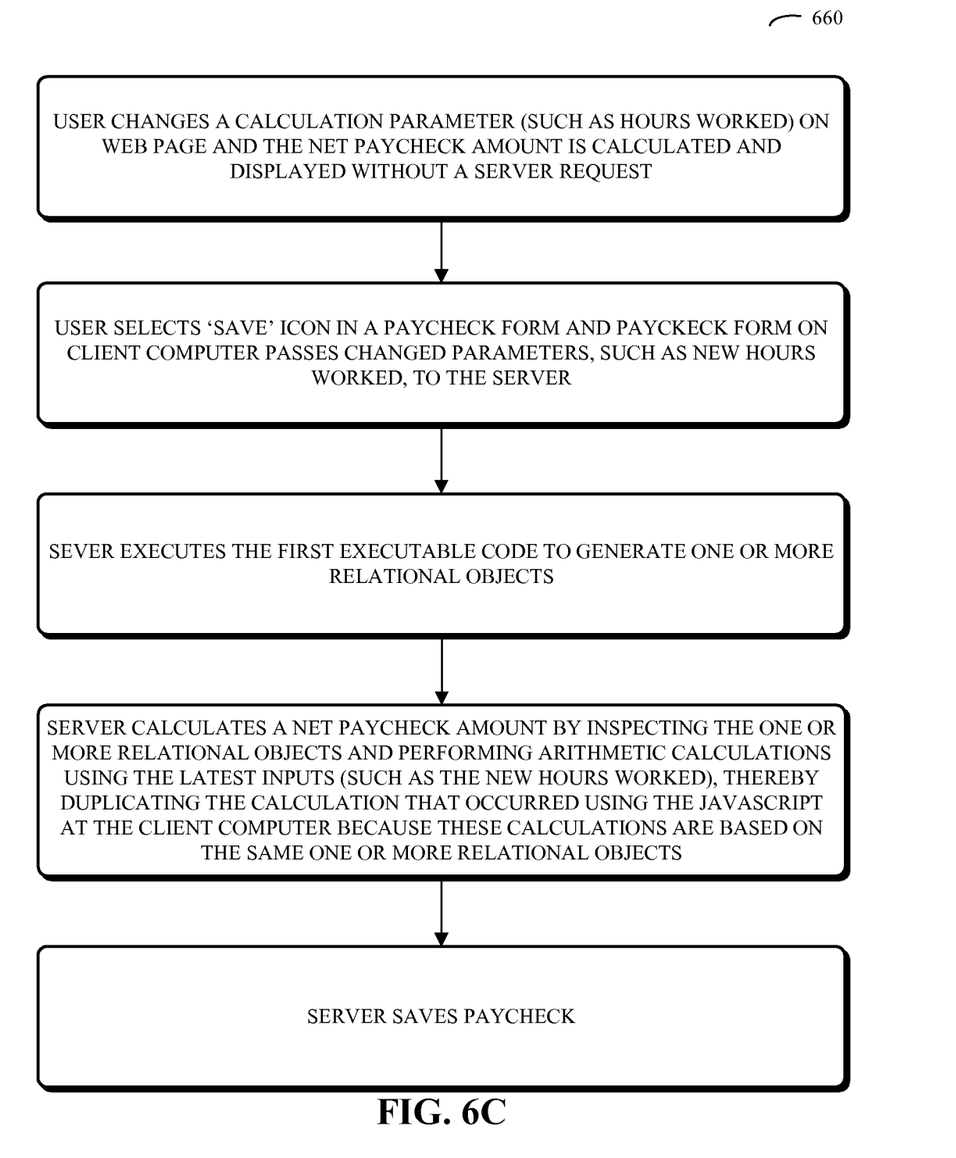
FIG. 6C is a flowchart illustrating a process for generating executable code in accordance with an embodiment of the present invention.

Additional exemplary embodiments are shown in FIGS. 6A-6C, which present flowcharts illustrating processes 600, 630 and 660 for generating executable code. During process 600, a programmer may write common source code, such as code in a payroll-domain specific language. Then, a Java™ code generator may generate Java™ from the common source code. Next, a Java™ compiler may generate one or more class files (i.e., the first executable code) for use on a server, which, when executed, can generate relational objects.

Subsequently, during process 630, a user at a client computer may request a payroll form, such as edit paycheck. Then, the user may initiate an edit-paycheck request (the user context) via a user interface, such as a web page. Next, the server may execute the first executable code to generate one or more relation objects, which are stored in memory, thereby representing a subset of the entire payroll logic in the common source code. Note that this subset is determined based on the user context associated with a given paycheck, such as: the date, state, filing status, etc. Moreover, the server may create second executable code (such as Javascript™) and a paycheck web page by inspecting the one or more relational objects, which the server may return to the user at the client computer.

Later, during process 660, the user changes a calculation parameter (such as the hours worked) on the web page and the net paycheck amount is calculated and displayed without a server request. Then, the user may select a 'save' icon on a paycheck form, which may be included in a web page on the client computer. This paycheck form on the client computer may pass changed parameters, such as new hours worked, to the server. Moreover, the server may execute the first executable code to generate one or more relational objects.

Next, the server may calculate a net paycheck amount by inspecting the one or more relational objects and performing arithmetic calculations using the latest inputs, such as the new hours, thereby duplicating the calculations that occurred using the Javascript™ at the client computer because these calculations are based on the same one or more relational objects. Moreover, the server may save the paycheck.

Figure 7:
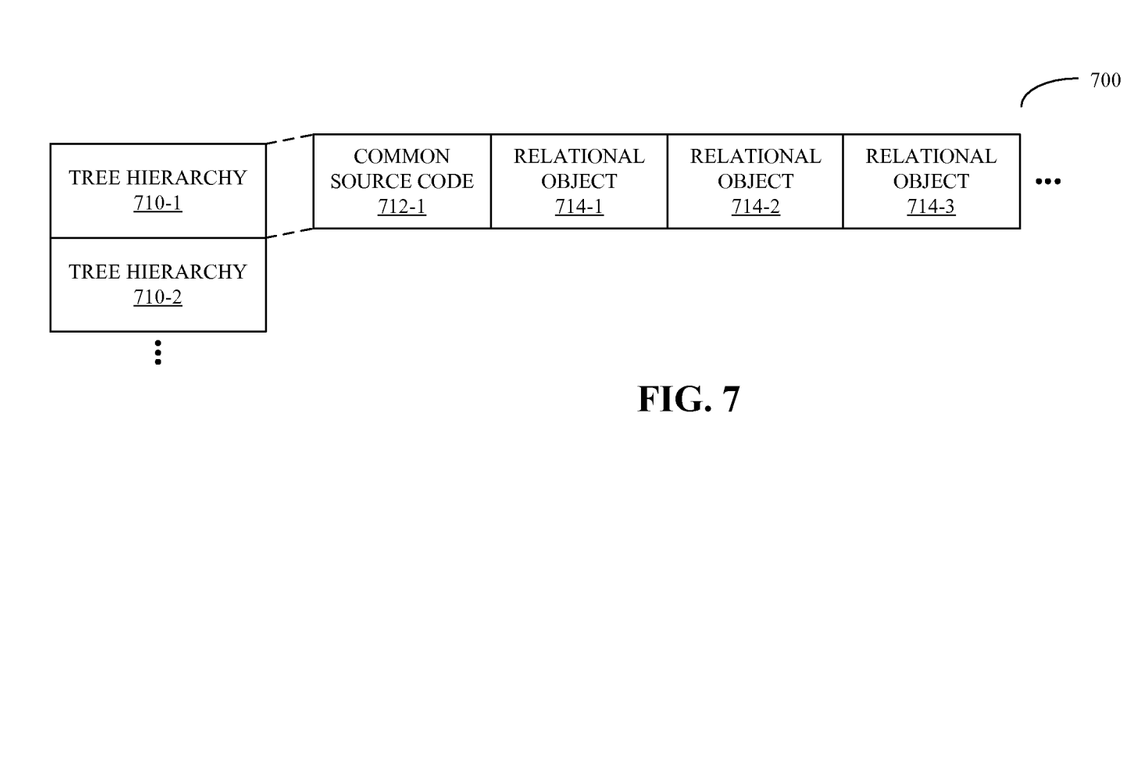
FIG. 7 is a block diagram illustrating a data structure in accordance with an embodiment of the present invention.

We now discuss data structures that may be used in the computer system 100 (FIG. 1) and/or 200 (FIG. 2). FIG. 7 presents a block diagram illustrating a data structure 700. This data structure may include tree hierarchies 710 generated from common source code. For example, entries for tree hierarchy 710-1 may include: a pointer to at least a portion of common source code 712-1, and one or more relational objects 714.

Note that that in some embodiments of the data structure 700 there may be fewer or additional components. Moreover, two or more components may be combined into a single component, and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for generating a software application for use at multiple locations in a client-server environment, comprising:
  receiving, at a server computer, a common source code that encodes an entire logic for a software application;
  generating, at the server computer, a first executable code from the received common source code, wherein the generated first executable code includes instructions for generating relational objects for execution on a client computer;
  receiving a request from a user at a client computer, via a user-interface associated with the software application;
  receiving, from the user at the client computer, via the user-interface, user information relevant to the request, wherein the user information is received from a form of a web page sent to the client computer and includes tax information entered into the form,
  in response to receiving the request and the tax information from the user, executing, at the server computer, the first executable code to produce a set of relational objects, wherein the generated relational objects are based on the received tax information relevant to the request, and wherein the generated relational objects represent a subset of the entire logic of the software application relevant to the received user request;
  creating, at runtime using the server computer:
    a second executable code from the generated set of relational objects,
    wherein the second executable code is an interpreted code executed by an interpreter application to process tax information entered into the form;
    a user interface page based on the generated set of relational objects, and
  sending the second executable code and the user interface page to the client computer, wherein the second executable code is configured to execute on the client computer, and wherein the created user interface page is configured for display at the client computer.

2. The method of claim 1, wherein the first executable code is compiled from the common source code, and wherein the generated set of relational objects constitute a tree hierarchy, wherein a given relational object defines a relationship between nodes and end points in the common source code.

3. the method of claim 2, wherein the interpreter application is configured to perform run-time calls implementing commands in the second executable code.

4. the method of claim 1, wherein the second executable code executes in a web browser environment at the client computer.

5. the method of claim 1, wherein the form includes one or more fields.

6. The method of claim 2, wherein the first executable code is associated with a first programming language and the second executable code is associated with a different second programming language.

7. the method of claim 1, wherein the second executable code includes objects that perform calculations.

8. The method of claim 6, wherein the second executable code is generated by translating the tree hierarchy associated with the set of relational objects into the second programming language.

9. the method of claim 2, wherein the nodes include mathematical operations.

10. the method of claim 2, wherein the nodes include Boolean logic.

11. the method of claim 2, wherein the end points include values.

12. the method of claim 1, wherein the common source code includes computer instructions that determine values.

13. the method of claim 6, wherein the first programming language includes Java™ and the second programming language includes Javascript™.

14. A computer-program product for use in conjunction with a computer system, the computer-program product comprising a non-transitory computer-readable storage medium and a computer-program mechanism embedded therein for configuring the computer system, the computer-program mechanism including:
  instructions for receiving, at a server computer, a common source code that encodes an entire logic for a software application;
  instructions for generating, at the server computer, a first executable code from the received common source code, wherein the generated first executable code includes instructions for generating relational objects for execution on a client computer instructions for receiving a request from a user at a client computer, via a user-interface associated with the software application;
  instructions for receiving, from the user at the client computer, via the user-interface, user information relevant to the request, wherein the user information is received from a form of a web page sent to the client computer and includes tax information entered into form;
  instructions for, in response to receiving the request and the tax information from the user, executing, at the server computer, the first executable code to produce a set of relational objects, wherein the generated relational objects are based on the received tax information relevant to the request, and wherein the generated relational objects represent a subset of the entire logic of the software application relevant to the received user request;
  instructions for creating, at runtime using the server computer:
    a second executable code from the generated set of relational objects, and wherein the second executable code is an interpreted code executed by an interpreter application to process tax information entered into the form;
    a user interface page based on the generated set of relational objects; and instructions for sending the second executable code and the user interface page to the client computer, wherein the second executable code is configured to execute on the client computer, and wherein the created user interface page is configured for display at the client computer.

15. the computer-program product of claim 14, wherein the form includes one or more fields.

16. the computer-program product of claim 14, wherein the first executable code is compiled from the common source code;
   wherein the produced set of relational objects constitute a tree hierarchy;
   wherein a given relational object defines a relationship between nodes and endpoints in the common source code; and
   wherein the second executable code is generated by translating the tree hierarchy.

17. the computer-program product of claim 16, wherein the nodes include mathematical operations or Boolean logic.

18. the computer-program product of claim 16, wherein the end points include values.

19. A computer system, comprising:
   a processor;
   memory; and
   a program module, wherein the program module is stored in the memory and configured to be executed by the processor, the program module including:
      instructions for receiving, at a server computer, a common source code that encodes an entire logic for a software application,
      instructions for generating, at the server computer, a first executable code from the received common source code, wherein the generated first executable code includes instructions for generating relational objects for execution on a client computer,
      instructions for receiving a request from a user at a client computer, via a user-interface associated with the software application,
      instructions for receiving, from the user at the client computer, via the user-interface, user information relevant to the request,
      instructions for receiving, from the user at the client computer, via the user-interface, user information relevant to the request, wherein the user information is received from a form of web page sent to the client computer and includes tax information entered into the form;
      instructions for, in response to receiving the request and the user information from the user, executing, at the server computer, the first executable code to produce a set of relational objects, wherein the generated relational objects are based on the received tax information relevant to the request, and wherein the generated relational objects represent a subset of the entire logic of the software relevant to the received user request;
      instructions for creating, at runtime using the server computer:
         a second executable code from the generated set of relational objects, wherein the second executable code is an interpreted code executed by an interpreter application to process tax information entered into the form;
         a user interface page based on the generated set of relational objects, and
      instructions for sending the second executable code and the user interface page to the client computer, wherein the second executable code is configured to execute on the client computer, and wherein the created user interface page is configured for display at the client computer.

* * * * *